US012806608B2

(12) United States Patent
Yuhas et al.

(10) Patent No.: US 12,806,608 B2
(45) Date of Patent: Nov. 24, 2026

(54) HIERARCHICAL METALLOPHOSPHATES, THEIR METHOD OF PREPARATION, AND USE

(71) Applicant: UOP LLC, Des Plaines, IL (US)

(72) Inventors: Benjamin D. Yuhas, Evanston, IL (US); Mimoza Sylejmani-Rekaliu, Bensenville, IL (US); Allison Theberge, Chicago, IL (US); Weiyao Zhang, Des Plaines, IL (US); Susan C. Koster, Carpentersville, IL (US)

(73) Assignee: UOP LLC, Des Plaines, IL (US)

( * ) Notice: Subject to any disclaimer, the term of this patent is extended or adjusted under 35 U.S.C. 154(b) by 485 days.

(21) Appl. No.: 18/394,285

(22) Filed: Jan. 9, 2024

(65) Prior Publication Data

US 2025/0222444 A1 Jul. 10, 2025

(51) Int. Cl.
*B01J 29/85* (2006.01)
*B01J 6/00* (2006.01)
(Continued)

(52) U.S. Cl.
CPC ............... *B01J 29/85* (2013.01); *B01J 6/001* (2013.01); *B01J 35/63* (2024.01); *B01J 37/08* (2013.01); *C10G 47/18* (2013.01)

(58) Field of Classification Search
USPC .......................................................... 502/214
See application file for complete search history.

(56) References Cited

U.S. PATENT DOCUMENTS 4,310,440 A 1/1982 Wilson et al.
4,440,871 A 4/1984 Lok et al.
(Continued)

FOREIGN PATENT DOCUMENTS

CN 112456512 A 3/2021

OTHER PUBLICATIONS

Ali, D., et al. Pinpointing basic sites formed upon incorporation of iron in hierarchical SAPO-11 using catalytic model reactions. Dalton Trans. 2022, 51, 15251. (Year: 2022).*

Ma, Z., et al. Synthesis of hierarchical SAPO-11 for hydroisomerization reaction in refinery processes. Appl. Petrochem. Res. (2014) 4:351-358. (Year: 2014).*

(Continued)

*Primary Examiner* — Anthony J Zimmer
*Assistant Examiner* — Zachary John Baum

(57) ABSTRACT

This invention relates to a novel family of hierarchical metallophosphates which are represented by the empirical formula:

$$R_r^+ M_m^{2+} EP_x Si_y O_z$$

where M is a divalent framework metal such as magnesium or zinc, R is an organoammonium cation, E is a trivalent framework element such as aluminum or gallium, and in which the hierarchical metallophosphates possess a pore structure having at least 75% of its total surface area being micropore surface area and a hierarchy factor of at least 0.09, said hierarchy factor defined as $[(V_{micro}/V_{tot})*(S_{meso}/S_{tot})]$, where $V_{micro}$ and $V_{tot}$ represent the micropore volume and total pore volume below 450 Å, respectively, and $S_{meso}$ and $S_{tot}$ represent the non-micropore surface area and total surface area, respectively. The hierarchical metallophosphates of the invention are of use in hydrocarbon conversion processes such as hydroisomerization or dewaxing.

6 Claims, 7 Drawing Sheets

(51) Int. Cl.

| | |
|---|---|
| ***B01J 35/63*** | (2024.01) |
| ***B01J 37/08*** | (2006.01) |
| ***C10G 47/18*** | (2006.01) |

(56) References Cited

U.S. PATENT DOCUMENTS

| | | | |
|---|---|---|---|
| 4,567,029 | A | 1/1986 | Wilson et al. |
| 4,973,785 | A | 11/1990 | Lok et al. |
| 5,126,308 | A | 6/1992 | Barger et al. |
| 5,296,208 | A | 3/1994 | Lesch |
| 7,807,132 | B2 | 10/2010 | Garcia-Martinez |
| 8,685,875 | B2 | 4/2014 | Garcia-Martinez |
| 8,747,652 | B2 | 6/2014 | Bonduelle et al. |
| 2016/0167030 | A1 | 6/2016 | Levy et al. |
| 2019/0030511 | A1 | 1/2019 | Yuhas et al. |
| 2022/0370979 | A1 | 11/2022 | De Silva et al. |

OTHER PUBLICATIONS

International Search Report from corresponding PCT application No. PCT/US2024/061403, mailed Apr. 11, 2025.

Written Opinion from corresponding PCT application No. PCT/US2024/061403, mailed Apr. 11, 2025.

Yuxiang Liu et al., Eco-friendly synthesis of hierarchical SAPO-11 with fluoride ions for hydroisomerization of n-hexane, Microporous and Mesoporous Materials 323 (2021) 111229.

Pérez-Ramírez, J., et al., Zeolite Catalysts with Tunable Hierarchy Factor by Pore-Growth Moderators, Adv. Func. Mater. 19, 3972-3979 (2009).

Zhang, M. et al., Shape Selectivity in Hydroisomerization of Hexadecane over Pt Supported on 10-Ring Zeolites: ZSM-22, ZSM-23, ZSM-35 and ZSM-48, Industrial & Engineering Chemistry Research 2016, 55, 6069-6078.

J.A. Martens et al., Evidences for pore mouth and key-lock catalysis in hydroisomerization of long n-alkanes over 10-ring tubular pore bifunctional zeolites, Catalysis Today 65 (2001) 111-116.

* cited by examiner

HIERARCHICAL METALLOPHOSPHATES, THEIR METHOD OF PREPARATION, AND USE

BACKGROUND OF THE INVENTION

This invention relates to a novel family of hierarchical metallophosphates which are represented by the empirical formula:

$$R_r^+ M_m^{2+} E P_x Si_y O_z$$

where M is a divalent framework metal such as magnesium or zinc, R is an organoammonium cation, E is a trivalent framework element such as aluminum or gallium, and in which the hierarchical metallophosphates possess a pore structure having at least 75% of the total surface area being micropore surface area and a hierarchy factor of at least 0.09, the hierarchy factor defined as $[(V_{micro}/V_{total})*(S_{meso}/S_{total})]$, where $V_{micro}$ and $V_{total}$ represent the micropore volume and total pore volume below 450 Å, respectively, and $S_{meso}$ and $S_{total}$ represent the non-micropore surface area and total surface area, respectively.

2. DESCRIPTION OF THE RELATED ART

Classes of molecular sieves include crystalline aluminophosphate, silicoaluminophosphate, or metalloaluminophosphate compositions which are microporous and which are formed from corner sharing $AlO_{4/2}$ and $PO_{4/2}$ tetrahedra. In 1982, Wilson et al. first reported aluminophosphate molecular sieves, the so-called AlPOs, which are microporous materials that have many of the same properties as zeolites, although they do not contain silica (See U.S. Pat. No. 4,310,440). Subsequently, charge was introduced to the neutral aluminophosphate frameworks via the substitution of $SiO_{4/2}$ tetrahedra for $PO_{4/2^+}$ tetrahedra to produce the SAPO molecular sieves as described by Lok et al. (See U.S. Pat. No. 4,440,871). Another way to introduce framework charge to neutral aluminophosphates is to substitute $[Me^{2+}O_{4/2}]^{2-}$ tetrahedra for $AlO_{4/2^-}$ tetrahedra, which yields the MeAPO molecular sieves (see U.S. Pat. No. 4,567,029). It is furthermore possible to introduce framework charge on AlPO-based molecular sieves via the simultaneous introduction of $SiO_{4/2}$ and $[M^{2+}O_{4/2}]^{2-}$ tetrahedra to the framework, giving MeAPSO molecular sieves (See U.S. Pat. No. 4,973,785).

Numerous molecular sieves, both naturally occurring and synthetically prepared, are used in various industrial processes. Synthetically, these molecular sieves are prepared via hydrothermal synthesis employing suitable sources of Si, Al, P, metals, and structure directing agents such as amines or organoammonium cations. The structure directing agents reside in the pores of the molecular sieve and are largely responsible for the particular structure that is ultimately formed. These species may balance the framework charge associated with silicon or other metals, such as Zn or Mg, in the aluminophosphate compositions, and can also serve as space fillers to stabilize the tetrahedral framework. Molecular sieves are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent molecular sieve crystal structure. Molecular sieves can be used as catalysts for hydrocarbon conversion reactions, which can take place on outside surfaces as well as on internal surfaces within the pore.

When considering the use of molecular sieves in catalysis, it is important to consider diffusion pathways for molecules inside the porous materials, particularly through the microporous network. Limitations on diffusion through a catalytic porous material can have negative effects on catalyst lifetime, activity or selectivity. For this reason, it can be advantageous to design or engineer the pore structure of a porous material to provide increased diffusion rates. This is typically done by creating larger pores in the materials, such as mesopores (20-450 Å in size according to the IUPAC definition) and macropores (>450 Å). Thus, the total pore volume of any porous solid can be described as the sum of macropore volume, mesopore volume, and micropore volume (consisting of pores <20 Å). The total surface area of a porous solid can be described in a similar way. Materials containing significant amounts of microporosity in addition to meso- or macroporosity are commonly referred to as hierarchical materials.

When designing hierarchical materials for use in catalysis, particular attention must be paid to the relative proportions of surface area and/or volume in each porosity regime. Depending on the catalytic process, it may be desirable to maximize meso/macroporosity in a given material at the relative expense of microporosity. For example, it is known in the art that aluminosilicates (i.e., zeolites) can be made hierarchical through the controlled removal of silicon from the crystalline framework (i.e., desilication), usually in the presence of alkaline medium, such as an alkali hydroxide solution. These hierarchical zeolites have been demonstrated to have enhanced cracking ability compared to their non-hierarchical counterparts, particularly when greater than 50% of the total pore volume is derived from meso- or macroporosity (see, for example, U.S. Pat. Nos. 7,807,132 and 8,685,875). In other catalytic applications, however, the optimal porosity distribution of a hierarchical material may differ.

DETAILED DESCRIPTION

Figure 1:
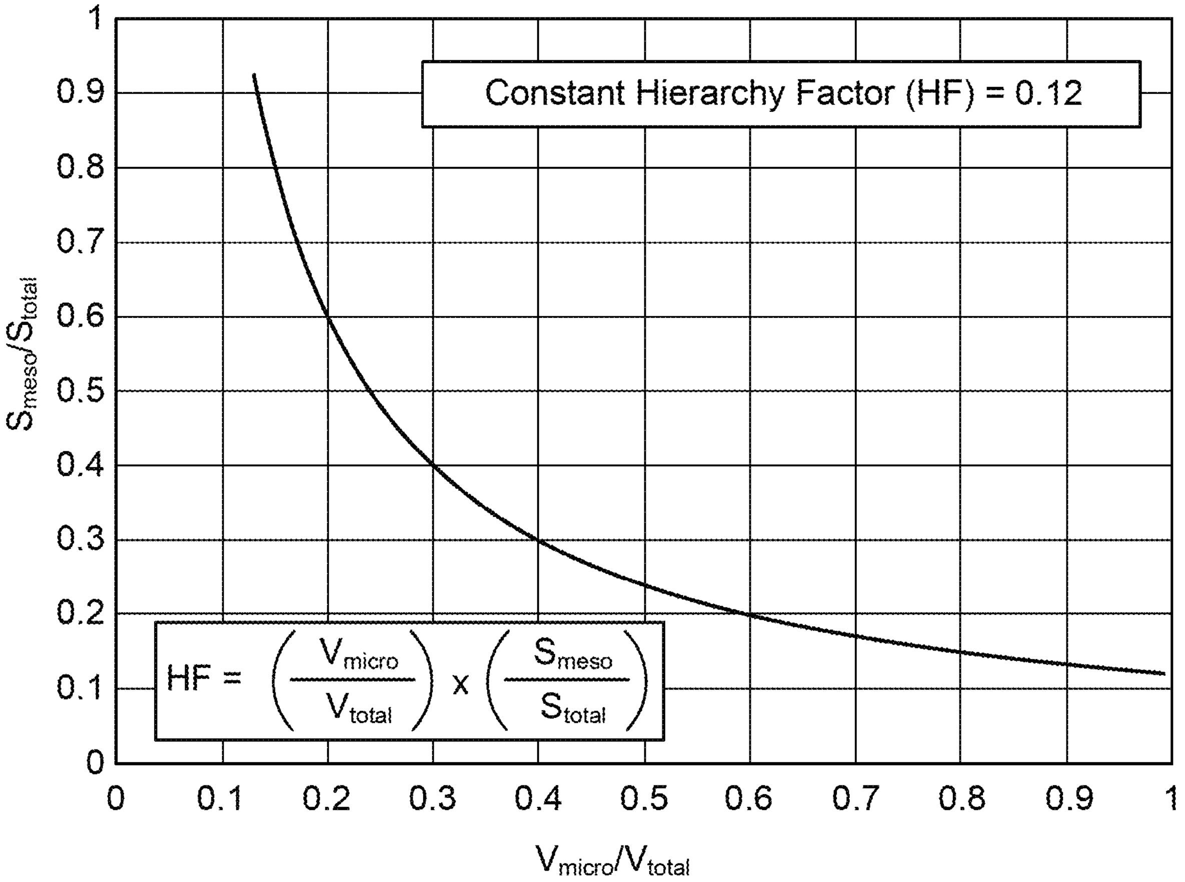
FIG. 1 is a graph showing the relationship between fractional micropore volume and fractional mesopore surface area at a constant hierarchy factor.

The invention disclosed herein comprises crystalline hierarchical metallophosphates which are characterized by their pore structure having at least 75%, or at least 77.5% of the surface area being micropore surface area and a hierarchy factor of at least 0.09, or of at least 0.095, or of at least 0.100, the hierarchy factor defined as $[(V_{micro}/V_{total})*(S_{meso}/S_{total})]$, where $V_{micro}$ and $V_{total}$ represent the micropore volume and total pore volume below 450 Å, respectively, and $S_{meso}$ and $S_{total}$ represent the non-micropore surface area and total surface area, respectively.

Accordingly, one embodiment of the invention is a porous crystalline material having a three-dimensional framework of at least $EO_{4/2}^-$ and $PO_{4/2}^+$ tetrahedral units and optionally, at least one of $[M^{2+}O_{4/2}]^{2-}$ and $SiO_{4/2}$ tetrahedral units and an empirical composition in the as-synthesized form and anhydrous basis expressed by an empirical formula of:

$$R_r^+ M_m^{2+} EP_x Si_y O_z$$

where M is at least one metal cation of valence +2 selected from the group consisting of $Be^{2+}$, $Mg^{2+}$, $Zn^{2+}$, $Co^{2+}$, $Mn^{2+}$, $Fe^{2+}$, $Ni^{2+}$; "m" is the mole ratio of M to E and varies from 0 to 1.0; R is an organoammonium cation; "r" is the mole ratio of R to E and has a value of 0 to 2.0; E is a trivalent element selected from the group consisting of aluminum, gallium, iron, boron and mixtures thereof; "x" is mole ratio of P to E and varies from 0.5 to 2.0; "y" is the mole ratio of Si to E and varies from 0 to 1.0; and "z" is the mole ratio of O to E and has a value determined by the equation:

$$z=(2m+r+3+5x+4y)/2$$

and where the pore structure of the crystalline material has at least 75%, or at least 77.5%, of its surface area being micropore surface area and a hierarchy factor of at least 0.09, or of at least 0.095, or of at least 0.100, said hierarchy factor defined as $[(V_{micro}/V_{total})*(S_{meso}/S_{total})]$, where $V_{micro}$ and $V_{total}$ represent the micropore volume and total pore volume below 450 Å, respectively, and $S_{meso}$ and $S_{total}$ represent the non-micropore surface area and total surface area, respectively.

Another embodiment of the invention is a porous crystalline material having a three-dimensional framework of at least $EO_{4/2}^-$ and $PO_{4/2}^+$ tetrahedral units and optionally, at least one of $[M^{2+}O_{4/2}]^{2-}$ and $SiO_{4/2}$ tetrahedral units, and an empirical composition in the calcined form and an anhydrous basis expressed by an empirical formula of:

$$H_w M_m^{2+} EP_x Si_y O_z$$

where "m", "x", "y" are as described above, H is a proton, "w" is the mole ratio of H to E and varies from 0 to 2.5, and "z" is the mole ratio of O to E and has a value determined by the equation:

$$z=(w+2m+3+5x+4y)/2$$

and in which the crystalline hierarchical metallophosphates has at least 75%, or at least 77.5% of its surface area being micropore surface area, and a hierarchy factor of at least 0.09, or of at least 0.095, or of at least 0.100, the hierarchy factor defined as $[(V_{micro}/V_{total})*(S_{meso}/S_{total})]$, where $V_{micro}$ and $V_{total}$ represent the micropore volume and total pore volume below 450 Å, respectively, and $S_{meso}$ and $S_{total}$ represent the non-micropore surface area and total surface area, respectively.

Another embodiment of the invention is a process for preparing the crystalline hierarchical metallophosphates described above. The process comprises forming a reaction mixture containing reactive sources of R, E, P, one or both of M and Si, and heating the reaction mixture at a temperature of 60° C. to 200° C. for a time sufficient to form the molecular sieve, the reaction mixture having a composition expressed in terms of mole ratios of the oxides of:

$$aR_2O: bMO:E_2O_3:cP_2O_5:dSiO_2:eH_2O$$

where "a" has a value of 0.75 to 12, "b" has a value of 0 to 2, "c" has a value of 0.5 to 8, "d" has a value of 0 to 4, and "e" has a value from 30 to 1000.

Yet another embodiment of the invention is a hydrocarbon conversion process using the above-described molecular sieve as a catalyst. The process comprises contacting at least one hydrocarbon with the molecular sieve at conversion conditions to generate at least one converted hydrocarbon.

The hierarchical metallophosphates of the present invention are a class of porous materials with a unique combination and distribution of pore sizes and volumes. It is well known in the art that molecular sieves such as aluminosilicates (zeolites), aluminophosphates (AlPOs), silicoaluminophosphates (SAPOs), and related materials are important heterogeneous catalysts which have relevance to many different industrial processes, such as cracking, isomerization, hydroisomerization, and alkylation. The above-listed molecular sieves are defined as microporous materials, which are formed from corner-sharing $SiO_{4/2}$, $AlO_{4/2}$ or $PO_{4/2}$ tetrahedra linked together in a crystalline, three-dimensional network. Micropores are defined by IUPAC as openings or apertures less than 20 Å in diameter. As such, the microporous nature of molecular sieves can provide excellent catalytic selectivity to a desired product or products, depending on the nature of the catalyzed reaction and the molecular sieve that is employed in the transformation. However, the small pore openings can restrict molecular diffusion in catalysis, which can adversely affect catalyst lifetime, activity, or selectivity. For this reason, it can be advantageous to design or engineer the pore structure of a porous material to remove diffusion barriers in catalysis.

In the case of zeolites, the engineering or modification of the pore structure is typically accomplished post-synthetically; that is, after the zeolite has been prepared from its primary reaction mixture and isolated as a powder. Modification of zeolites is usually accomplished in caustic or alkaline media, which can also remove silicon from the zeolite framework. In many cases, the zeolite modification can occur in the presence of surfactant molecules, which can direct the size and shape of the newly forming mesopores. Examples of this type of zeolite modification in the presence of surfactants include those found in U.S. Pat. Nos. 7,807,132 and 8,685,875.

When designing materials with both micropores and meso/macropores, it is useful to have a convenient way to describe the relative amounts of each type of porosity in the material. One such metric that can be used to compare the relative amounts of each type of porosity is called the hierarchy factor. As described by Pérez-Ramirez et al. (Pérez-Ramirez, J., Verboekend, D., Bonilla, A., Abelló, S. *Adv. Func. Mater.* 19, 3972 (2009)), the hierarchy factor (HF) of a material is defined as:

$$HF=\left(\frac{V_{micro}}{V_{total}}\right)\times\left(\frac{S_{meso}}{S_{total}}\right)$$

where $V_{micro}$ and $V_{total}$ represent the micropore volume and total pore volume below 450 Å, respectively, and $S_{meso}$ and $S_{total}$ represent the non-micropore surface area and total surface area, respectively. The definitions of micropore and mesopore follow those from the International Union of Pure and Applied Chemistry (IUPAC); namely, that mesopores range from 20-450 Å in size and micropores are less than 20 Å in diameter. As can be seen in FIG. 1, a wide variety of products can lead to a given HF value; however, two materials that have the same HF will not necessarily have the same catalytic properties.

The invention disclosed herein comprises crystalline hierarchical metallophosphates which are characterized by their pore structure having at least 75% of its surface area being micropore surface area (that is, $S_{meso}/S_{total}$ is less than 0.25) and a hierarchy factor of at least 0.09, said hierarchy factor defined as described above. This combination of porosity characteristics is unique in the art and is shown to be advantageous for various catalytic processes, in particular isomerization and hydroisomerization.

The hierarchical metallophosphates of the present invention have a three-dimensional crystalline framework of at least $EO_{4/2}^{-}$ and $PO_{4/2}^{+}$ tetrahedral units and optionally, at least one of $[M^{2+}O_{4/2}]^{2-}$ and $SiO_{4/2}$ tetrahedral units and an empirical composition in the as-synthesized form and anhydrous basis expressed by an empirical formula of:

$$R_r^+ M_m^{2+} EP_x Si_y O_z$$

where M is at least one metal cation of valence +2 selected from the group consisting of $Be^{2+}$, $Mg^{2+}$, $Zn^{2+}$, $Co^{2+}$, $Mn^{2+}$, $Fe^{2+}$, $Ni^{2+}$, "m" is the mole ratio of M to E and varies from 0 to 1.0, and R is an organoammonium cation "r" is the mole ratio of R to E and has a value of 0 to 2.0, E is a trivalent element selected from the group consisting of aluminum, gallium, iron, boron and mixtures thereof, "x" is mole ratio of P to E and varies from 0.5 to 2.0, "y" is the mole ratio of Si to E and varies from 0 to 1.0, and "z" is the mole ratio of O to E and has a value determined by the equation:

$$z=(2m+r+3+5x+4y)/2$$

Figure 2:
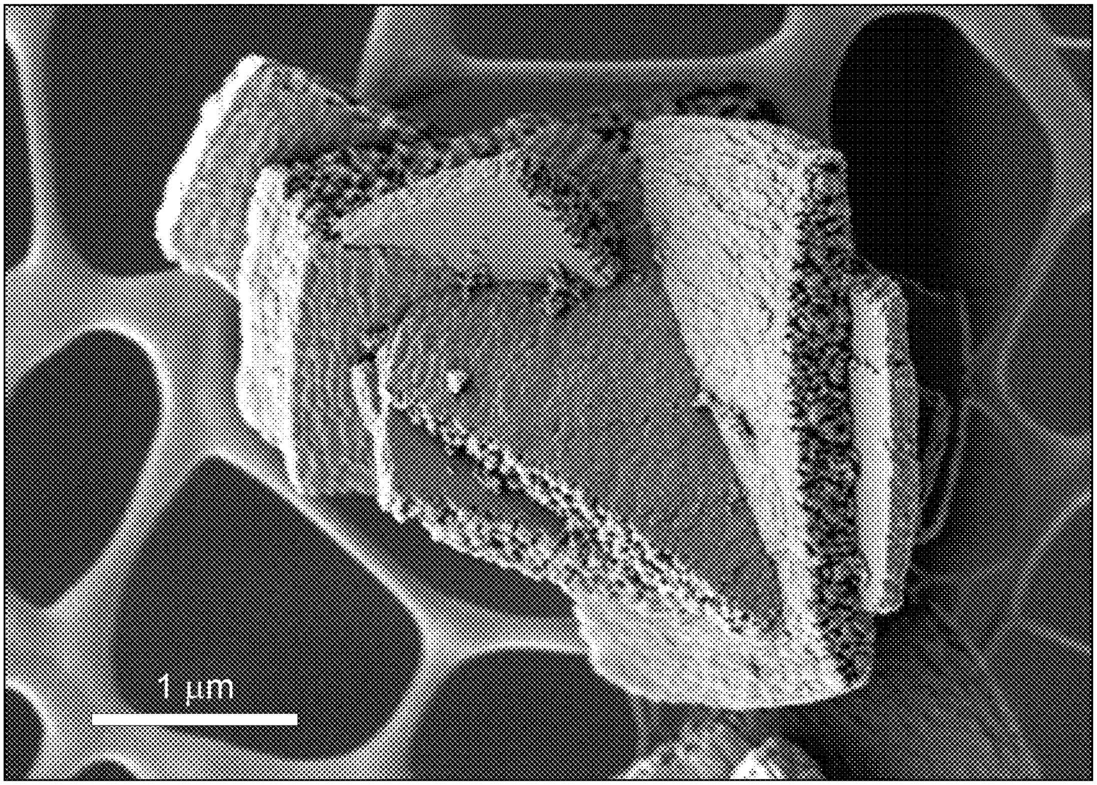
FIG. 2 is a scanning electron microscope (SEM) image of an exemplary hierarchical metallophosphate according to an embodiment described herein.

FIG. 2 shows a scanning electron microscope (SEM) image of an exemplary hierarchical metallophosphate. The hierarchical metallophosphates of the present invention are made through standard hydrothermal synthesis techniques that are well-known to those skilled in the art. Briefly, a source of E, P, and Si are combined into a slurry, and a source of R in the form of an organic structure-directing agent (OSDA) is also added. Other metal sources (M) may also be added to the gel, such as salts or oxides of magnesium, iron, titanium, manganese, cobalt, boron, or copper. The slurry or gel is heated in an autoclave for a given time and temperature, and the crystalline products are harvested, washed with water, and dried. The heating time may be anywhere from 1 to 21 days, and the heating temperature may be anywhere from 60° C. to 200° C.

In one embodiment of the invention, E is Al.

In another embodiment of the invention, the source of R is a secondary amine.

Figure 3A:
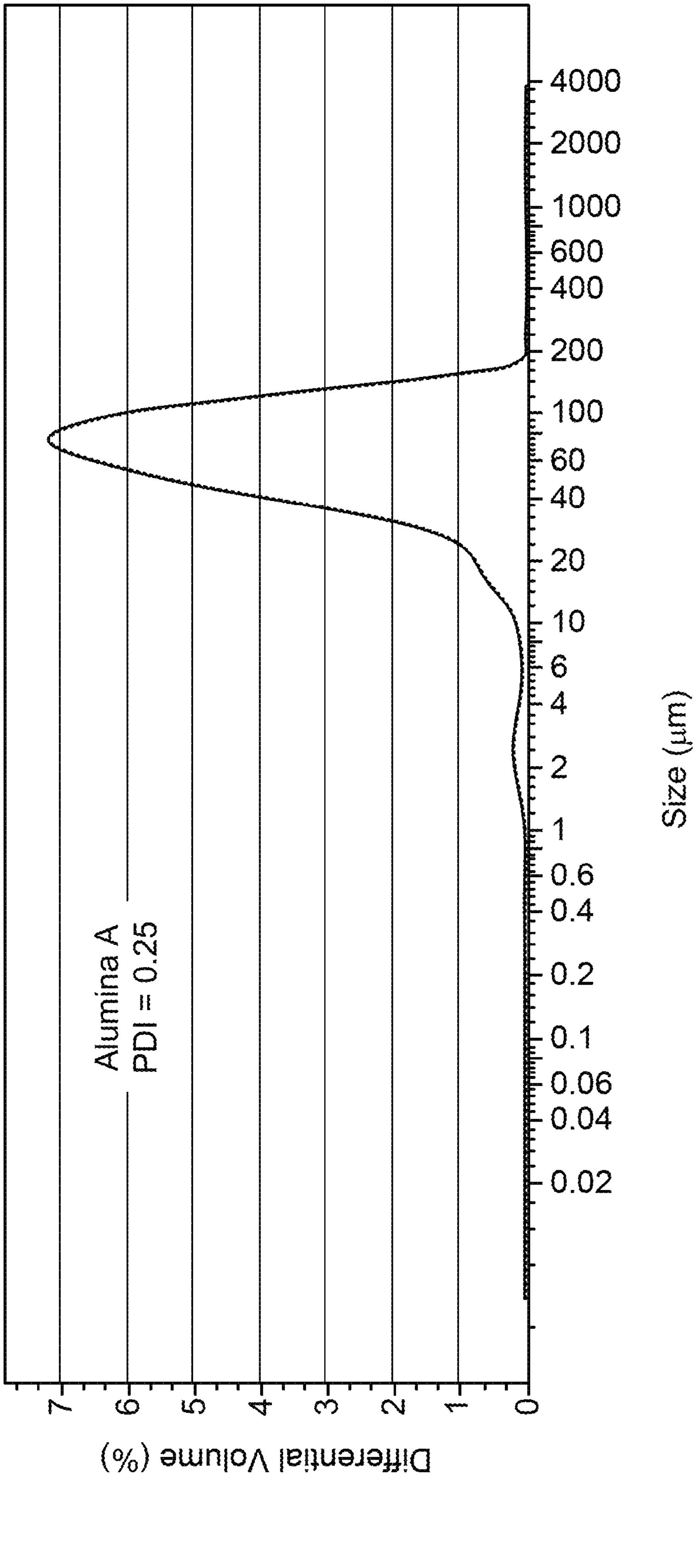
FIGS. 3A-C are graphs showing particle size distributions of different sources of alumina.
Figure 3B:
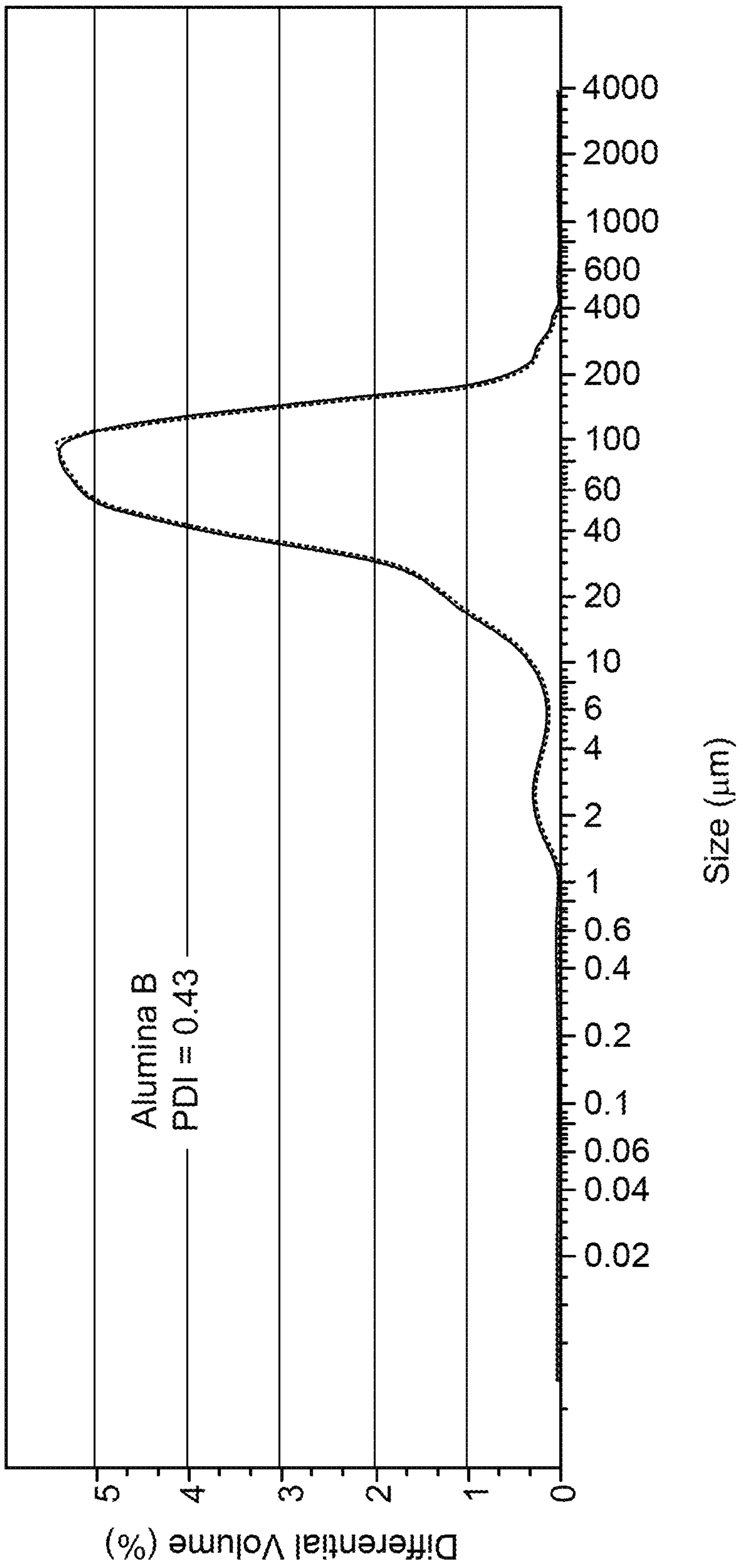
Figure 3C:
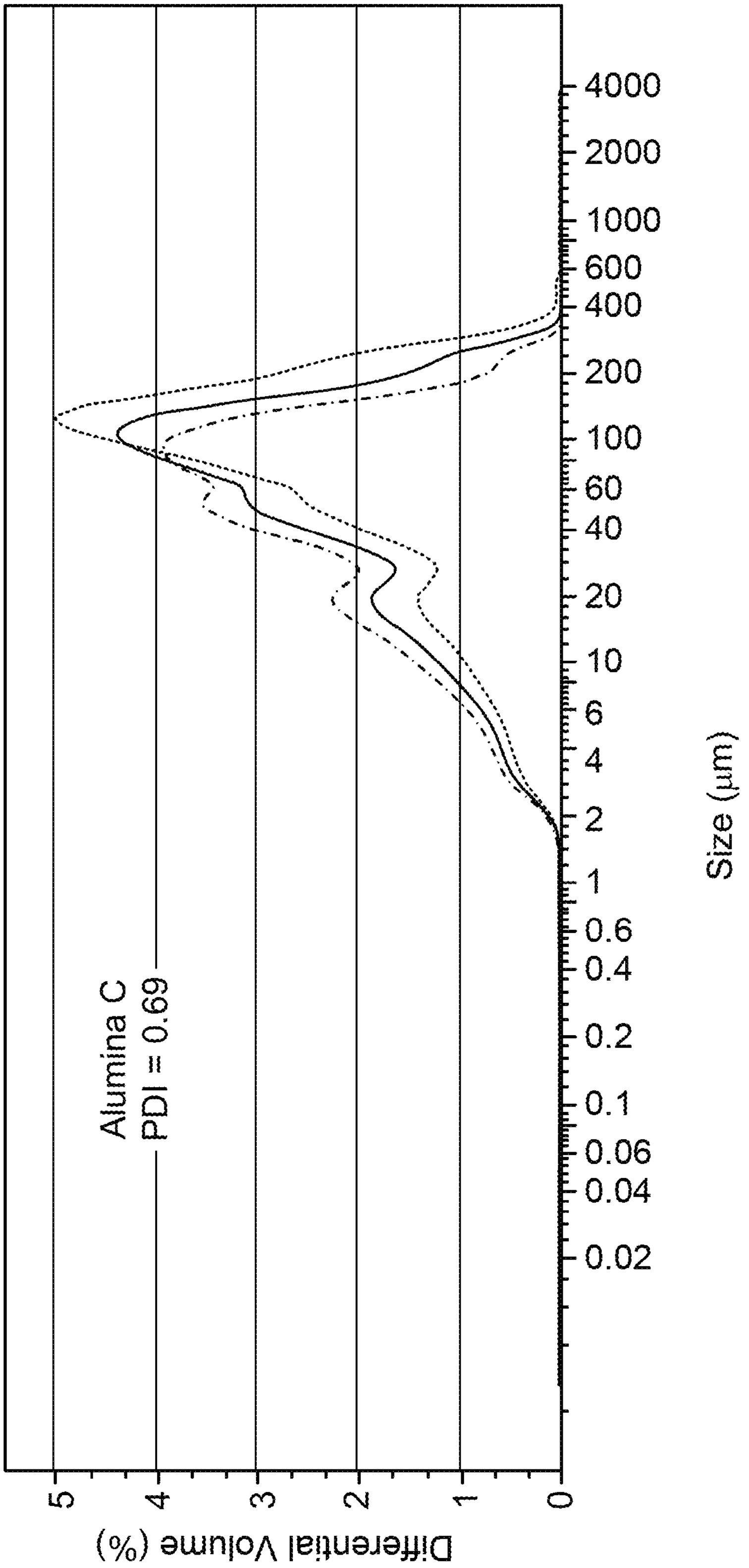

In still another embodiment of the invention, the source of E is a solid with a polydispersity index (PDI) of less than 0.5. The polydispersity index is calculated by obtaining particle size distributions via techniques such as light scattering. An example is shown in FIGS. 3A-3C, showing particle size distributions of different sources of Al with the calculated polydispersity given in the graph inset.

In yet another embodiment, the reaction mixture is distilled at high temperature prior to cooldown and solids collection. The distillation may be performed as described in U.S. Pat. No. 5,296,208.

The hierarchical metallophosphates may be calcined in either air or nitrogen to remove the occluded OSDA. In one embodiment of the invention, the hierarchical metallophosphate is calcined at a temperature of at least 550° C. In another embodiment of the invention, the hierarchical metallophosphate is calcined at a temperature of at least 600° C. The calcined form of the hierarchical metallophosphates may be described by the empirical formula:

$$H_w M_m^{2+} EP_x Si_y O_z$$

where "m", "x", "y" are as described above, H is a proton, "w" is the mole ratio of H to E and varies from 0 to 2.5, and "z" is the mole ratio of O to E and has a value determined by the equation:

$$z=(w+2m+3+5x+4y)/2$$

The calcined hierarchical metallophosphates may be characterized by a number of different methods, including x-ray diffraction. The hierarchical metallophosphates may be described as a crystalline zeotype, as defined by the International Zeolite Association (IZA). In a preferred embodiment, the hierarchical metallophosphates have a crystalline framework with a 1-dimensional microporous channel system. In one embodiment, the hierarchical metallophosphates have the structure of the AFI, AEL, ATO, or AFO zeotypes, as well as combinations of the same. In one embodiment, the hierarchical metallophosphates have the structure of the AEL or AFO zeotypes.

Figure 4:
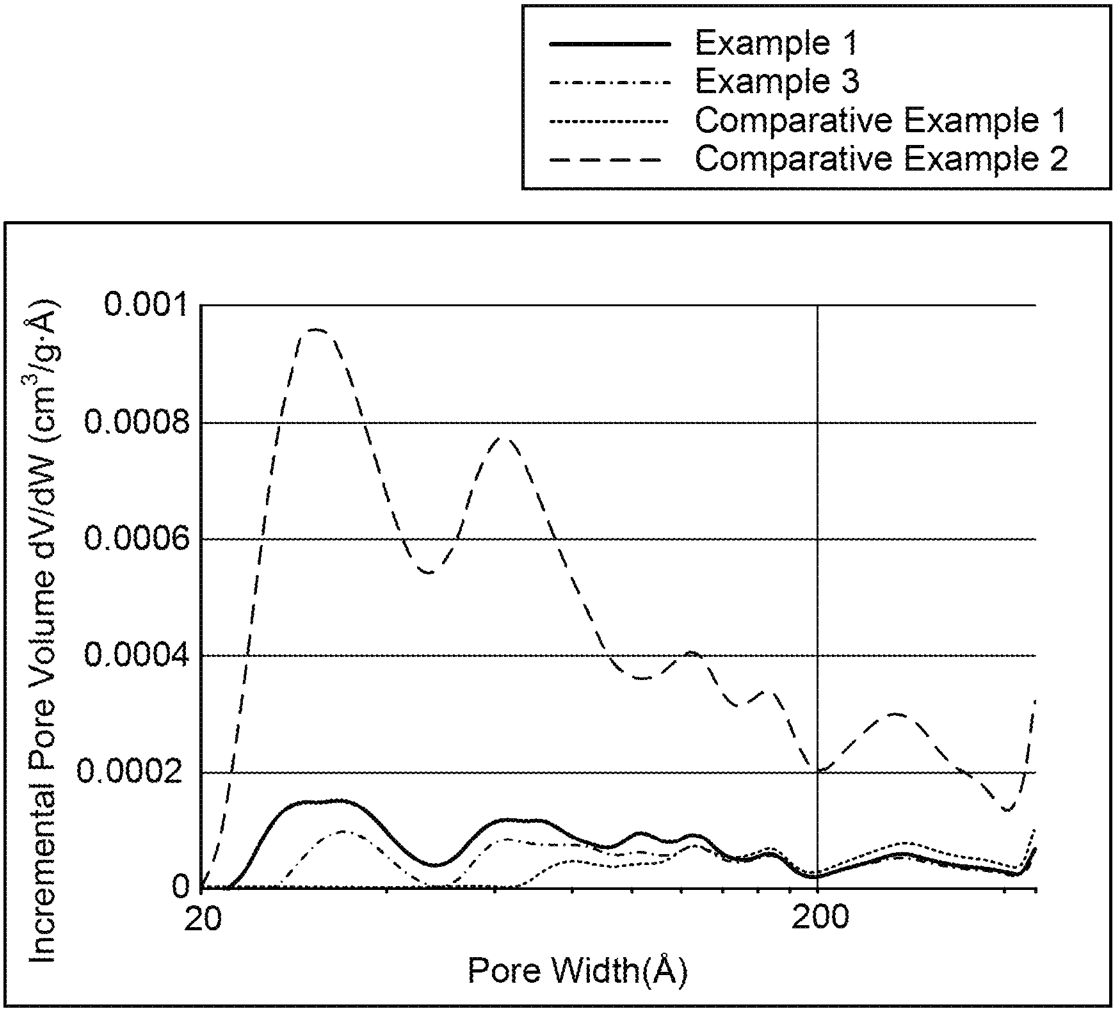
FIG. 4 is a graph showing the pore size distribution of exemplary hierarchical metallophosphates along with comparative examples.

The pore volumes and surface areas of the hierarchical metallophosphates are obtained from adsorption isotherms using techniques that are known to those skilled in the art. Typically, nitrogen adsorption isotherms acquired at a temperature of 77K are used to extract information regarding the porosity of a given material. In the case of the present invention, the nitrogen adsorption isotherms were measured at 77K in a Micromeritics ASAP 2020 instrument. The hierarchical metallophosphates (and comparative examples) were calcined to remove any occluded organic species. The total pore volume and micropore volume, as well as the overall pore size distribution were determined using non-linear density functional theory (NLDFT) fitting on the obtained isotherms. An example is shown in FIG. 4. 20 Å and 450 Å were used as the cutoff points for microporosity and mesoporosity, respectively.

The hierarchical metallophosphates with the unique combination and distribution of pore sizes and volumes, namely, their pore structure having at least 75% of its surface area being micropore surface area and a hierarchy factor of at least 0.09, are synthesized without the use of pore-forming agents or surfactants. This stands in contrast to teachings from the prior art, such as the use of cetyltrimethylammonium-based surfactants (see, for example, U.S. Pat. Nos.

7,807,132 and 8,685,875) or polymeric pore-forming agents (see, for example, CN112456512A). Indeed, the use of these types of species leads to materials with a greater proportion of mesopore surface area and mesopore volume that is outside the specifications of the present invention. As we have determined, the present invention is preferred for certain types of catalysis, namely hydroisomerization catalysis, as the materials of the present invention maintain a high degree of microporosity, while at the same time they possess enough mesoporosity to allow for better diffusion without sacrificing catalyst activity. This is reasonable given that hydroisomerization is believed to proceed via a pore-mouth catalytic mechanism (see, for example, Zhang, M. et al., *Ind. Eng. Chem. Res.* 55, 6069 (2016), Martens, J. A., et al., *Catalysis Today* 65, 111 (2001); it is thus desired to have a catalyst with a high degree of microporosity, but also with some mesoporosity to enhance diffusion. The hierarchical metallophosphates of the present invention satisfy both demands and are thus very effective catalysts when compared against materials described by prior art.

Another embodiment of the invention is a process for preparing the crystalline hierarchical metallophosphates described above. The process comprises forming a reaction mixture containing reactive sources of R, E, P, one or both of M and Si, and heating the reaction mixture at a temperature of 60° C. to 200° C. for a time sufficient to form the hierarchical metallophosphates, the reaction mixture having a composition expressed in terms of mole ratios of the oxides of:

$$aR_2O: bMO{:}E_2O_3{:}cP_2O_5{:}dSiO_2{:}eH_2O$$

where “a” has a value of 0.75 to 12, “b” has a value of 0 to 2, “c” has a value of 0.5 to 8, “d” has a value of 0 to 4, and “e” has a value from 30 to 1000. A preferred form of the invention is when E is aluminum. The sources of aluminum include, but are not limited to, aluminum alkoxides, precipitated aluminas, aluminum metal, aluminum hydroxide, aluminum salts, and alumina sols. Specific examples of aluminum alkoxides include, but are not limited to, aluminum ortho sec-butoxide and aluminum ortho isopropoxide. In one embodiment of the invention, the source of alumina has a polydispersity index of less than 0.5. The polydispersity index is calculated by obtaining particle size distributions via techniques such as light scattering. An example is shown in FIGS. 3A-3C, showing particle size distributions of different sources of Al with the calculated polydispersity given in the graph inset. This property is desirable as it allows for more uniform reaction rates with the phosphorus source, and allows for a nucleation and growth pathway that leads to the materials with the properties of the present invention.

Sources of phosphorus include, but are not limited to, orthophosphoric acid, phosphorus pentoxide, and ammonium dihydrogen phosphate. Sources of silica include but are not limited to tetraethylorthosilicate, colloidal silica, and precipitated silica. Sources of the other E elements include but are not limited to organoammonium borates, boric acid, precipitated gallium oxyhydroxide, gallium sulfate, ferric sulfate, and ferric chloride. Sources of the M metals include the halide salts, nitrate salts, acetate salts, and sulfate salts of the respective alkaline earth and transition metals. R is an organoammonium cation that arises from a protonated organic alkylamine. In one embodiment of the invention, the alkylamine is a secondary amine. In one embodiment of the invention, the alkylamine is di-n-propylamine or di-isopropylamine, or a combination thereof.

The reaction mixture containing reactive sources of R, E, P, and one or both of M and Si is heated at temperature of 60° C. to 200° C. for a time sufficient to form the hierarchical metallophosphates. The reaction vessel may be heated with stirring, heated while tumbling, or heated quiescently. The reaction mixture may be distilled to remove the alkylamine OSDA, in a manner such as described in U.S. Pat. No. 5,296,208. The distillation may occur immediately prior to cooldown, or immediately upon reaching maximum reaction temperature, or anytime in between.

The as-prepared hierarchical metallophosphates may be extruded with an appropriate binder material for forming into a shaped catalyst. Such binder materials may include clays such as kaolin, meta-kaolin, or aluminas, as well as silicas and amorphous silica-aluminas (ASAs). Other oxide binder materials include, but are not limited to, titania and zirconia.

The formed catalysts containing the hierarchical metallophosphates of this invention can be used as a catalyst or catalyst support in various hydrocarbon conversion processes. Hydrocarbon conversion processes are well known in the art and include, but are not limited to, cracking, hydrocracking, alkylation of both aromatics and isoparaffins, isomerization, polymerization, reforming, hydrogenation, dehydrogenation, transalkylation, dealkylation, hydration, dehydration, hydrotreating, hydrodenitrogenation, hydrodesulfurization, methanol to olefins conversion processes, methanation, and syngas shift processes. Specific reaction conditions and the types of feeds which can be used in these processes are set forth in U.S. Pat. Nos. 4,310,440, 4,440,871, and 5,126,308, which are incorporated by reference.

In one embodiment, the formed catalysts containing the hierarchical metallophosphates of this invention are used in hydroisomerization catalysis, with a metal function impregnated into the catalyst. Examples of the metal function may include, but are not limited to, Pt, Pd, Rh, Ag, Ni, Mo, W, Cu, Fe, Co, and Ir. The source of the metal used in the catalyst formulation may include, but is not limited to, the metal nitrate, sulfate, halide, or other salts. The hydroisomerization is carried out on feedstock containing primarily n-hydrocarbons in a reaction range of 200-400° C.

In order to more fully illustrate the invention, the following examples are set forth. It is to be understood that the examples are only by way of illustration and are not intended as an undue limitation on the broad scope of the invention as set forth in the appended claims.

Example 1

To 530.7 g of water, 189.3 g of orthophosphoric acid (85% w/w) was added. 151.1 g of di-n-propylamine was then added over the course of 10-15 minutes. After cooling the solution, 116.3 g of a pseudoboehmite alumina with a polydispersity index (PDI) of 0.25 (Alumina A on FIG. 3A) was added, followed by 11.1 g of fumed silica (HiSil 250), 4.3 g of SAPO-11 seeds, and finally 101.4 g additional water. After all components were added, the slurry was mixed for 15 minutes before loading into a stirred autoclave. After sealing the autoclave, the headspace was purged with nitrogen. The crystallizer was heated to 100° C. in 1 hour. At this point, a steam injection was used to heat the gel from 100° C. to 150° C., again over the course of an hour. Following the steam injection, the temperature was ramped from 150° C. to the final reaction temperature of 190° C. in a 5-hr ramp. The crystallizer was held for 12 hours at this temperature, during which the reaction mixture was periodically distilled to remove di-n-propylamine. Afterwards, the reactor was cooled to room temperature and the solids harvested by centrifugation. The solids were thoroughly washed and dried at 100° C. X-ray diffraction analysis revealed that the material was SAPO-11.

Example 2

To 535.4 g of water, 189.3 g of orthophosphoric acid (85% w/w) was added. 151.1 g of di-n-propylamine was then added over the course of 10-15 minutes. After cooling the solution, 111.7 g of a pseudoboehmite alumina with a polydispersity index (PDI) of 0.25 (Alumina A on FIG. 3A) was added, followed by 11.1 g of fumed silica (HiSil 250), 4.3 g of SAPO-11 seeds, and finally 101.4 g additional water. After all components were added, the slurry was mixed for 15 minutes before loading into a stirred autoclave. After sealing the autoclave, the headspace was purged with nitrogen. The crystallizer was heated to 100° C. in 1 hour. At this point, a steam injection was used to heat the gel from 100° C. to 150° C., again over the course of an hour. Following the steam injection, the temperature was ramped from 150° C. to the final reaction temperature of 190° C. in a 5-hr ramp. When the reactor temperature reached 190° C., the reaction mixture was distilled over the course of 4 hours. After distillation, the reaction mixture was further heated for another 8 hours at 190° C. before cooling to room temperature. The solids were harvested by centrifugation, thoroughly washed, and dried at 100° C. X-ray diffraction analysis revealed that the material was SAPO-11 with a trace amount of SAPO-41.

Example 3

To 532.4 g of water, 187.9 g of orthophosphoric acid (85% w/w) was added. 158.3 g of di-n-propylamine was then added over the course of 10-15 minutes. After cooling the solution, 109.8 g of a pseudoboehmite alumina with a polydispersity index (PDI) of 0.43 (Alumina B on FIG. 3B) was added, followed by 11.1 g of fumed silica (HiSil 250), 4.3 g of SAPO-11 seeds, and finally 101.4 g additional water. After all components were added, the slurry was mixed for 15 minutes before loading into a stirred autoclave. After sealing the autoclave, the headspace was purged with nitrogen. The crystallizer was heated to 100° C. in 1 hour. At this point, a steam injection was used to heat the gel from 100° C. to 150° C., again over the course of an hour. Following the steam injection, the temperature was ramped from 150° C. to the final reaction temperature of 190° C. in a 5-hr ramp. The crystallizer was held for 12 hours at this temperature, during which the reaction mixture was periodically distilled to remove di-n-propylamine. Afterwards, the reactor was cooled to room temperature and the solids harvested by centrifugation. The solids were thoroughly washed and dried at 100° C. X-ray diffraction analysis revealed that the material was SAPO-11.

Comparative Example 1

To 532.3 g of water, 189.3 g of orthophosphoric acid (85% w/w) was added. 151.1 g of di-n-propylamine was then added over the course of 10-15 minutes. After cooling the solution, 116.3 g of a pseudoboehmite alumina with a polydispersity index (PDI) of 0.69 (Alumina C on FIG. 3C) was added, followed by 11.1 g of fumed silica (HiSil 250), 4.3 g of SAPO-11 seeds, and finally 101.4 g additional water. After all components were added, the slurry was mixed for 15 minutes before loading into a stirred autoclave. After sealing the autoclave, the headspace was purged with nitrogen. The crystallizer was heated to 100° C. in 1 hour. At this point, a steam injection was used to heat the gel from 100° C. to 150° C., again over the course of an hour. Following the steam injection, the temperature was ramped from 150° C. to the final reaction temperature of 190° C. in a 5-hr ramp. The crystallizer was held for 12 hours at this temperature, during which the reaction mixture was periodically distilled to remove di-n-propylamine. Afterwards, the reactor was cooled to room temperature and the solids harvested by centrifugation. The solids were thoroughly washed and dried at 100° C. X-ray diffraction analysis revealed that the material was SAPO-11.

Comparative Example 2

To 604.8 g water, 109.0 g of a psuedoboehmite with a polydispersity index (PDI) of 0.69 (Alumina C on FIG. 3C) was added, followed by 144.2 g of di-n-propylamine and 10.7 g of fumed silica (HiSil 250). Next, 180.6 g of orthophosphoric acid (85% w/w) is added. After cooling the slurry, 4.2 g of SAPO-11 seeds were added, followed by 21 g of dimethyloctadecyl(3-trimethoxysilylpropyl)arnmonium chloride (TPOAC; 42% w/w in methanol). The slurry was loaded into a stirred autoclave and heated at 190° C. for 5 days. Afterwards, the reactor was cooled to room temperature and the solids harvested by centrifugation. The solids were thoroughly washed and dried at 100° C. X-ray diffraction analysis revealed that the material was SAPO-11.

Example 4

The products of Examples 1-3, as well as Comparative Examples 1 and 2, were all calcined in air in a muffle furnace at 650° C. The furnace was ramped at 2° C./min to the target temperature. After calcination for 4 hours at 650° C., the sample was cooled to room temperature. Nitrogen adsorption isotherms were acquired at 77K for all of the calcined materials. After analysis of the isotherms using non-linear density functional theory (NLDFT) fitting, the porosity distributions of the materials were obtained, as represented in the table below:

| Sample | Surface Area ($m^2$/g) | Total Pore Volume Below 450 Å (cc/g) | Cumulative Pore Volume at 20 Å (cc/g) | Micropore Surface Area ($m^2$/g) | Hierarchy Factor |
|---|---|---|---|---|---|
| Example 1 | 246 | 0.127 | 0.103 | 210 | 0.119 |
| Example 2 | 270 | 0.132 | 0.111 | 239 | 0.097 |
| Example 3 | 268 | 0.132 | 0.113 | 237 | 0.099 |
| Comp. Ex. 1 | 247 | 0.238 | 0.097 | 147 | 0.165 |
| Comp. Ex. 2 | 271 | 0.136 | 0.116 | 251 | 0.063 |

Example 5

Figure 5:
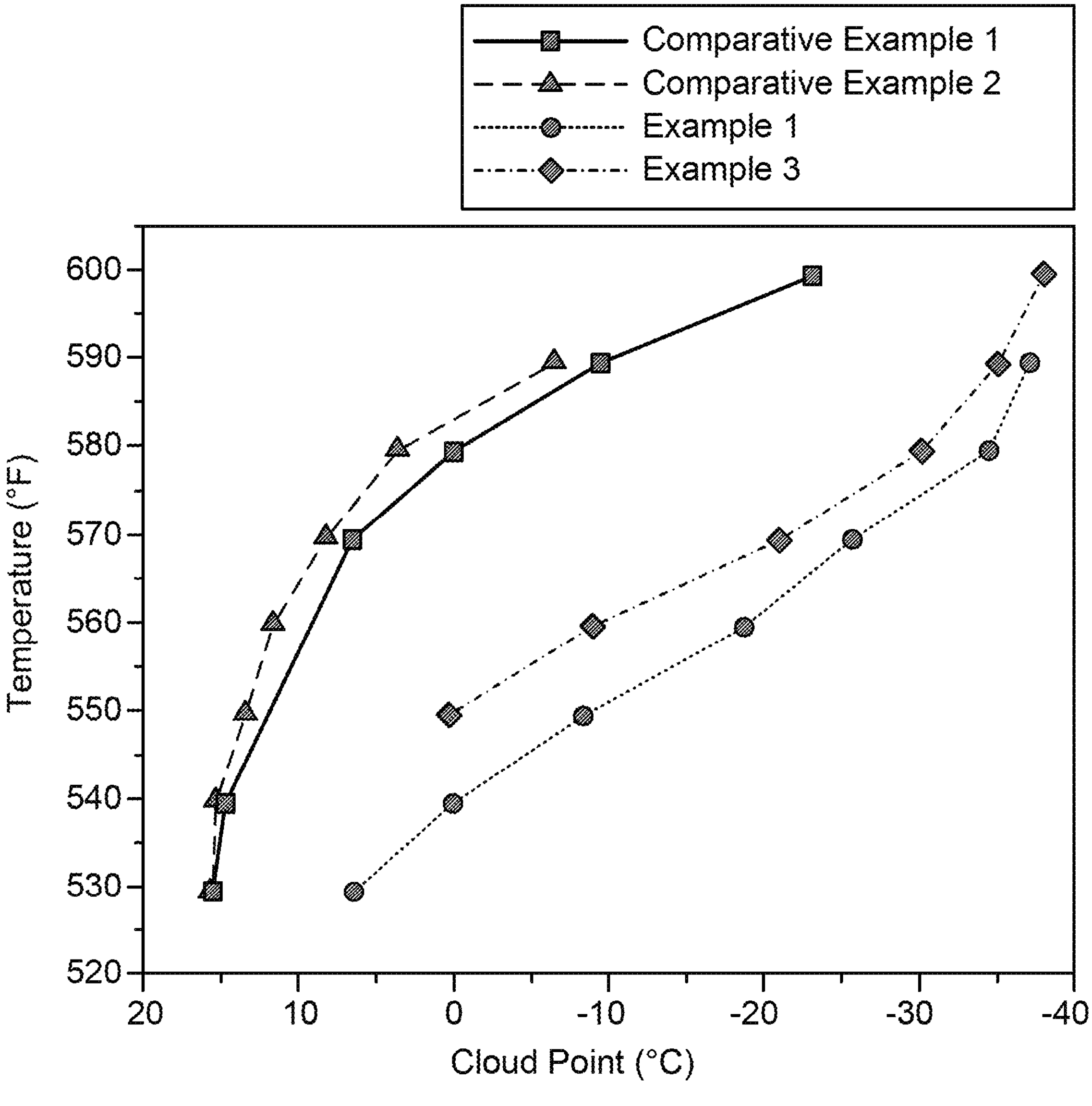
FIG. 5 is a graph showing hydroisomerization activity of a catalyst containing exemplary hierarchical metallophosphates along with comparative examples.

The products of Example 1 and Comparative Examples 1 and 2 were made into extrudates with an alumina binder. Platinum was added to the extrudate via impregnation with a platinum salt. The finished catalysts were examined for hydroisomerization activity using an n-hexadecane feed under hydrogen flow. The cloud points of the reacted products were examined as a function of plant temperature and are presented in FIG. 5. The hierarchical metallophosphates of the present invention were found to have superior hydroisomerization activity over the comparative examples.

Specific Embodiments

While the following is described in conjunction with specific embodiments, it will be understood that this description is intended to illustrate and not limit the scope of the preceding description and the appended claims.

A first embodiment of the invention is a composition that has a composition in an as-synthesized form and on an anhydrous basis expressed by an empirical formula $$[R_r^+ M_m^{2+} EP_x Si_y O_z]$$

where M is a cation selected from the group consisting of beryllium, magnesium, cobalt (II), manganese, zinc, iron (II), nickel, and mixtures thereof, R is an organoammonium cation; "r" is a mole ratio of R to E and varies from 0 to 2.0; "m" is a mole ratio of M to E and varies from 0 to 1.0; "x" is a mole ratio of P to E and varies from 0.5 to 2.0; "y" is a ratio of silicon to E and varies from 0 to 1.0; E is a trivalent element which is tetrahedrally coordinated, is present in the framework, and is selected from the group consisting of aluminum, gallium, iron (III), and boron; and "z" is a mole ratio of O to E and is given by an equation z=(2m+r+3+5x+4y)/2 and is characterized by a pore structure having at least 75% of its surface area being micropore surface area and a hierarchy factor of at least 0.09, the hierarchy factor defined as $[(V_{micro}/V_{total})*(S_{meso}/S_{total})]$ where $V_{micro}$ and $V_{total}$ represent the micropore volume and total pore volume below 450 Å, respectively, and $S_{meso}$ and $S_{total}$ represent the non-micropore surface area and total surface area, respectively. An embodiment of the invention is one, any or all of prior embodiments in this paragraph up through the first embodiment in this paragraph where the crystalline hierarchical metallophosphate has a framework of 1-dimensional microporous channels. An embodiment of the invention is one, any or all of prior embodiments in this paragraph up through the first embodiment in this paragraph where the crystalline hierarchical metallophosphate has a structure of an AEL zeotype, or an ATO zeotype, or an AFO zeotype, or an AFI zeotype, or combinations thereof. An embodiment of the invention is one, any or all of prior embodiments in this paragraph up through the first embodiment in this paragraph where the crystalline hierarchical metallophosphate contains in its as-synthesized form di-n-propylamine, diisopropylamine, diethylamine, di-n-butylamine, or mixtures thereof. An embodiment of the invention is one, any or all of prior embodiments in this paragraph up through the first embodiment in this paragraph where the crystalline hierarchical metallophosphate has at least 75% of its total pore volume as micropore volume. An embodiment of the invention is one, any or all of prior embodiments in this paragraph up through the first embodiment in this paragraph in a calcined form characterized on an anhydrous basis by the empirical formula $H_wM_m^{2+}EP_xSi_yO_z$ where "m", "x", "y" are as described above; H is a proton; "w" is a mole ratio of H to E and varies from 0 to 2.5; and "z" is a mole ratio of O to E and has a value determined by the equation z=(w+2m+3+5x+4y)/2 and in which the crystalline hierarchical metallophosphate has at least 75% of its surface area being micropore surface area and a hierarchy factor of at least 0.09, the hierarchy factor defined as $[(V_{micro}/V_{total})*(S_{meso}/S_{total})]$, where $V_{micro}$ and $V_{total}$ represent the micropore volume and total pore volume below 450 Å, respectively, and $S_{meso}$ and $S_{total}$ represent the non-micropore surface area and total surface area, respectively.

A second embodiment of the invention is a method of making a crystalline hierarchical metallophosphate comprising; preparing a reaction mixture containing reactive sources of R, E, P, one or both of M and Si, and heating the reaction mixture at a temperature of 60° C. to 200° C. for a time sufficient to form the hierarchical metallophosphate, the reaction mixture having a composition expressed in terms of mole ratios of the oxides of $$aR_2O: bMO:E_2O_3:cP_2O_5:dSiO_2:eH_2O$$

where "a" has a value of 0 to 12; "b" has a value of 0 to 2; "c" has a value of 0.5 to 8; "d" has a value of 0 to 4; and "e" has a value from 30 to 1000; where M is a cation selected from the group consisting of beryllium, magnesium, cobalt (II), manganese, zinc, iron (II), nickel, and mixtures thereof; R is an organoammonium cation; E is a trivalent element which is tetrahedrally coordinated, is present in the framework, and is selected from the group consisting of aluminum, gallium, iron (III), and boron; reacting the reaction mixture at a temperature in a range of 60° C. to 200° C. for a period of 1 day to 21 days; and isolating a solid crystalline hierarchical metallophosphate from a heterogeneous mixture. An embodiment of the invention is one, any or all of prior embodiments in this paragraph up through the second embodiment in this paragraph where E is aluminum. An embodiment of the invention is one, any or all of prior embodiments in this paragraph up through the second embodiment in this paragraph where the source of R is di-n-propylamine, diisopropylamine, diethylamine, di-n-butylamine, or mixtures thereof. An embodiment of the invention is one, any or all of prior embodiments in this paragraph up through the second embodiment in this paragraph where the source of E is a solid with a polydispersity index of less than 0.4. An embodiment of the invention is one, any or all of prior embodiments in this paragraph up through the second embodiment in this paragraph further comprising distilling the reaction mixture at a temperature greater than or equal to 100° C.; and cooling the distilled reaction mixture before isolating the solid hierarchical metallophosphate.

A third embodiment of the invention is a process of catalyzing a hydrocarbon conversion process comprising contacting a feed stream with a crystalline hierarchical metallophosphate that has an empirical composition in a calcined form and on an anhydrous basis expressed by an empirical formula $$H_wM_m^{2+}EP_xSi_yO_z$$

where H is a proton; wherein M is a cation selected from the group consisting of beryllium, magnesium, cobalt (II), manganese, zinc, iron (II), nickel, and mixtures thereof; R is an organoammonium cation; "r" is a mole ratio of R to E and varies from −0 to 2.0; "m" is a mole ratio of M to E and varies from 0 to 1.0; "x" is a mole ratio of P to E and varies from 0.5 to 2.0; "y" is a ratio of silicon to E and varies from 0 to 1.0; "w" is a mole ratio of H to E and varies from 0 to 2.5; E is a trivalent element which is tetrahedrally coordinated, is present in the framework, and is selected from the group consisting of aluminum, gallium, iron(III), and boron; and "z" is a mole ratio of O to E and is given by an equation z=(w+2m+3+5x+4y)/2 and in which the crystalline hierarchical metallophosphate has at least 75% of its surface area being micropore surface area and a hierarchy factor of at least 0.09, the hierarchy factor defined as $[(V_{micro}/V_{total})*(S_{meso}/S_{total})]$, where $V_{micro}$ and $V_{total}$ represent the micropore volume and total pore volume below 450 Å, respectively, and $S_{meso}$ and $S_{total}$ represent the non-micropore surface area and total surface area, respectively. An embodiment of the invention is one, any or all of prior embodiments in this paragraph up through the third embodiment in this paragraph where the hydrocarbon conversion process is isomerization or hydroisomerization. An embodiment of the invention is one, any or all of prior embodiments in this paragraph up through the third embodiment in this paragraph where the hydrocarbon conversion process is hydrocracking or hydrotreating. An embodiment of the invention is one, any or all of prior embodiments in this paragraph up through the third embodiment in this paragraph where the feed stream comprises greater than or equal to 50% on a weight basis n-hydrocarbons with a carbon number greater than eight. An embodiment of the invention is one, any or all of prior embodiments in this paragraph up through the third embodiment in this paragraph where the crystalline hierarchical metallophosphate is extruded or bound with an oxide support. An embodiment of the invention is one, any or all of prior embodiments in this paragraph up through the third embodiment in this paragraph where the oxide support is kaolin or meta-kaolin. An embodiment of the invention is one, any or all of prior embodiments in this paragraph up through the third embodiment in this paragraph where the oxide support is an alumina, a silica, or an amorphous silica-alumina. An embodiment of the invention is one, any or all of prior embodiments in this paragraph up through the third embodiment in this paragraph where the oxide support is titania or zirconia.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A crystalline hierarchical metallophosphate that has a composition in an as-synthesized form and on an anhydrous basis expressed by an empirical formula:

$$\left[R_r^+ M_m^{2+} E P_x \mathrm{Si}_y \mathrm{O}_z\right]$$

where M is a cation selected from the group consisting of beryllium, magnesium, cobalt (II), manganese, zinc, iron (II), nickel, and mixtures thereof; R is an organo-ammonium cation; "r" is a mole ratio of R to E and varies from 0 to 2.0; "m" is a mole ratio of M to E and varies from 0 to 1.0; "x" is a mole ratio of P to E and varies from 0.5 to 2.0; "y" is a ratio of silicon to E and varies from 0 to 1.0; E is a trivalent element which is tetrahedrally coordinated, is present in the framework, and is selected from the group consisting of aluminum, gallium, iron (III), and boron; and "z" is a mole ratio of O to E and is given by an equation $$z=(2m+r+3+5x+4y)/2$$

and is characterized by a pore structure having at least 75% of its surface area being micropore surface area and a hierarchy factor of at least 0.09, the hierarchy factor defined as $$\left[\left(V_{micro}/V_{total}\right)*\left(S_{meso}/S_{total}\right)\right]$$

where $V_{micro}$ and $V_{total}$ represent the micropore volume and total pore volume below 450 Å, respectively, and $S_{meso}$ and $S_{total}$ represent the non-micropore surface area and total surface area, respectively.

2. The crystalline hierarchical metallophosphate of claim 1 where the crystalline hierarchical metallophosphate has a framework of 1-dimensional microporous channels.

3. The crystalline hierarchical metallophosphate of claim 1 where the crystalline hierarchical metallophosphate has a structure of an AEL zeotype, or an ATO zeotype, or an AFO zeotype, or an AF zeotype, or combinations thereof.

4. The crystalline hierarchical metallophosphate of claim 1 where the crystalline hierarchical metallophosphate contains in its as-synthesized form di-n-propylamine, diisopropylamine, diethylamine, di-n-butylamine, or mixtures thereof.

5. The crystalline hierarchical metallophosphate of claim 1 where the crystalline hierarchical metallophosphate has at least 75% of its total pore volume as micropore volume.

6. The crystalline hierarchical metallophosphate of claim 1 in a calcined form characterized on an anhydrous basis by the empirical formula:

$$H_w M_m^{2+} E P_x \mathrm{Si}_y \mathrm{O}_z$$

where "m", "x", "y" are as described above; H is a proton; "w" is a mole ratio of H to E and varies from 0 to 2.5; and "z" is a mole ratio of O to E and has a value determined by the equation:

$$z=(w+2m+3+5x+4y)/2$$

and in which the crystalline hierarchical metallophosphate has at least 75% of its surface area being micropore surface area and a hierarchy factor of at least 0.09, the hierarchy factor defined as $[(V_{micro}/V_{total})*(S_{meso}/S_{total})]$, where $V_{micro}$ and $V_{total}$ represent the micropore volume and total pore volume below 450 Å, respectively, and $S_{meso}$ and $S_{total}$ represent the non-micropore surface area and total surface area, respectively.

* * * * *